United States Patent [19]

Bradbury

[11] 4,199,316

[45] Apr. 22, 1980

[54] TOOLS FOR INJECTION MOULDING MACHINES

[75] Inventor: Stanley A. Bradbury, London, England

[73] Assignee: Cable Supports Limited, United Kingdom

[21] Appl. No.: 917,969

[22] Filed: Jun. 22, 1978

[30] Foreign Application Priority Data

Mar. 9, 1978 [GB] United Kingdom ............... 9446/78

[51] Int. Cl.² .................................................. B29F 1/06
[52] U.S. Cl. ................................... 425/577; 425/128; 425/414; 425/468
[58] Field of Search ............... 425/577, 542, 110, 128, 425/129 R, 117, 125, 468, DIG. 58, 414; 249/59

[56] References Cited

U.S. PATENT DOCUMENTS

| | | | |
|---|---|---|---|
| 2,454,561 | 11/1948 | Lester | 425/577 |
| 2,997,742 | 8/1961 | Mieville | 425/129 |
| 3,275,054 | 9/1966 | Ohl | 425/542 |
| 3,388,431 | 6/1968 | Aoki | 425/577 |
| 3,950,119 | 4/1976 | Reichenbach | 425/129 |

Primary Examiner—Donald J. Arnold
Attorney, Agent, or Firm—Jacobi, Lilling & Siegel

[57] ABSTRACT

A tool for use in a moulding machine suited to introducing plastic material under pressure into the mould, comprises a two part mould defining a mould cavity, the mould cavity including a recess formed in one of the parts. The other part closes the recess in use and has slidably mounted therein at least one support member for supporting a core insert in the mould cavity. The or each support member being moveable between a first position in which the member projects into the mould cavity to support the core insert at the commencement of a moulding operation and a second position in which the member is at least partially retracted from the mould cavity to disengage from the core insert. Thus when material is introduced into the mould cavity the or each support member is urged from the first to the second position by pressure of the material after the core insert has been enveloped in the material.

7 Claims, 6 Drawing Figures

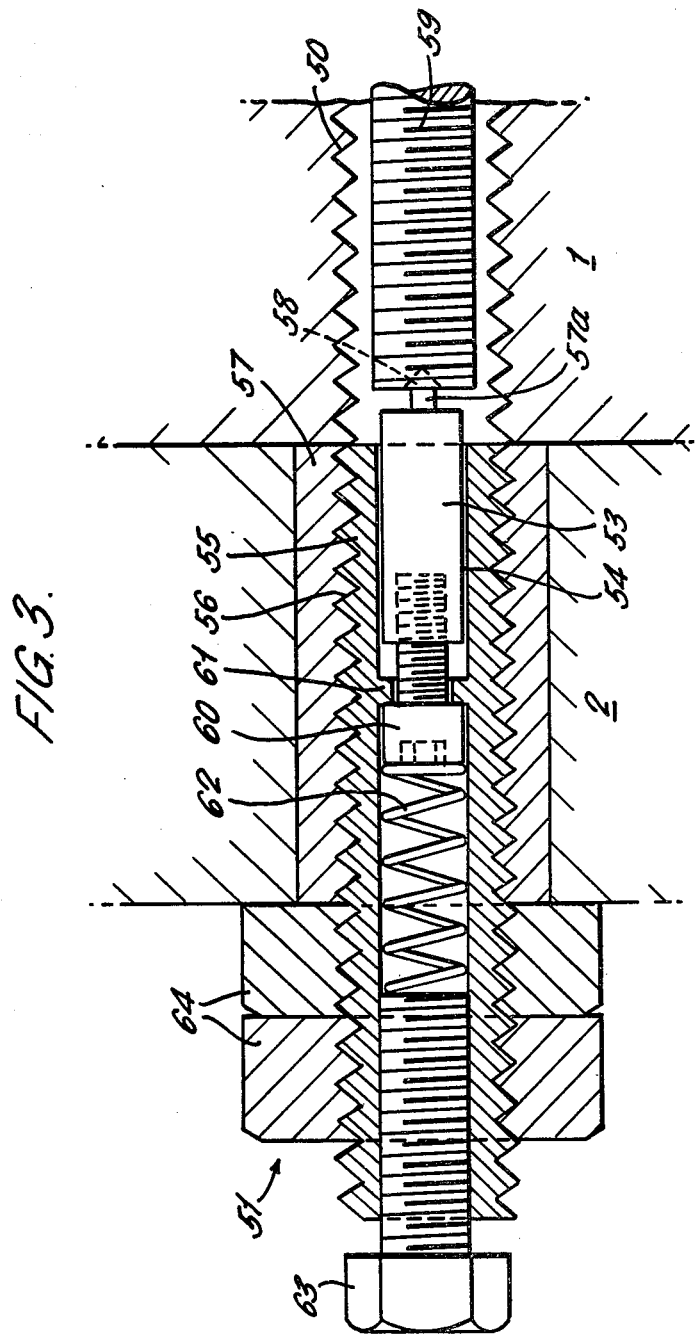

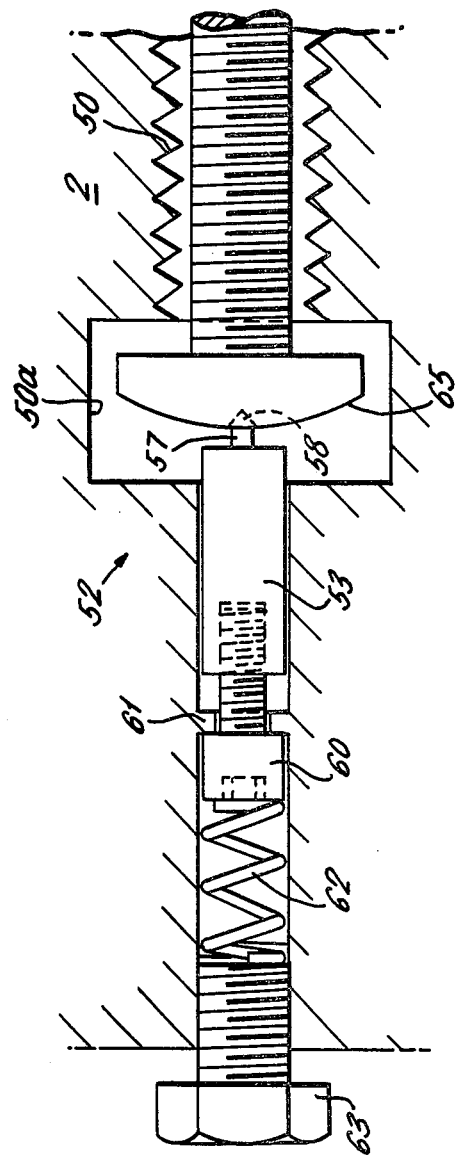

TOOLS FOR INJECTION MOULDING MACHINES

FIELD OF THE INVENTION

This invention relates to moulding machines suited to introducing plastic material under pressure into the mould, and particularly to a tool for use in machines for manufacturing plastics members, such as nuts, bolts or studs, for example, in which metallic cores are embedded for reinforcement.

SUMMARY OF THE INVENTION

The invention provides a tool for use in a moulding machine comprising:
 a mould defining a mould cavity;
 means for introducing plastic material under pressure into the mould; and
 means for supporting a core insert in the mould cavity away from the mould during a moulding operation comprising at least one support member, means for mounting the or each support member for movement between a first position in which the member projects into the mould cavity so as to support the core insert at the commencement of a moulding operation and a second position in which the member is at least partially retracted from the mould cavity to disengage from the core insert such that, in use, the support member is urged from the first position to the second position by the pressure of material introduced into the mould cavity during the moulding operation after the core insert has been enveloped in the material.

Thus the core insert will be wholly enclosed by the moulded material.

More specifically, the support member may have a projecting spigot at the one end thereof extending into the mould for engaging the core insert so that the end of the member is spaced from the core insert to receive the force of the pressurised material to urge the member from the mould cavity.

Spring means may be provided for resisting the retraction of the member so that the member is only retracted after the cavity has been filled with material and pressurised.

Preferably a stop is provided for limiting the retraction of the member from the cavity so that the end of the member is substantially flush with the surface of the cavity when the member is retracted into engagement with the stop.

In a further arrangement the means for supporting a core insert comprises a pair of coaxial elongate support members located one inside the other, each having a free end which is shaped to engage a respective portion of the core insert, the free ends projecting into the mould cavity as aforesaid by differing amounts, the two support members being telescoped one within the other and spring means being provided to urge the two members into the mould cavity the members being retracted against the action of the spring means by said material. Stop members may be provided to halt the retraction of the support members after they have travelled through respective predetermined distances during retraction.

In a preferred embodiment of the invention, the mould is formed in two parts, the first part defining a recess in one of its surfaces, the second part defining a bore extending from one of its surfaces the support member or support members being slidably located in the bore, said second part being abuttable, in use, with said first part to close the recess with its bore aligned with the recess, the recess and the second part together defining the mould cavity.

In the case where the tool is to be used in the manufacture of an elongate member, such as a bolt or stud, the recess may extend through said first part and the mould may further comprise a third part defining a bore extending from a surface thereof for slidably receiving a further support member or members therein and being abuttable with said first part to close, in use, the other end of the recess to that closed by the second part, the mould cavity being defined by the recess and said second and third parts. The moulding machines suited to introducing plastic material under pressure into the mould in which the tools of this invention can be used are commonly designated as injection moulding and as transfer moulding machines.

BRIEF DESCRIPTION OF THE DRAWINGS

FIG. 1b shows a plan view of a back nut made using the tool illustrated in FIG. 1a;

FIG. 2b shows a plan view of a nut made using the tool illustrated in FIG. 2a;

FIG. 3 shows a part of a tool for use in a moulding machine according to a third embodiment for making a steel-cored stud; and FIG. 4 illustrates a part of a tool for use in a moulding machine for making a steel-cored set screw.

DESCRIPTION OF THE PREFERRED EMBODIMENTS

Figure 1A:
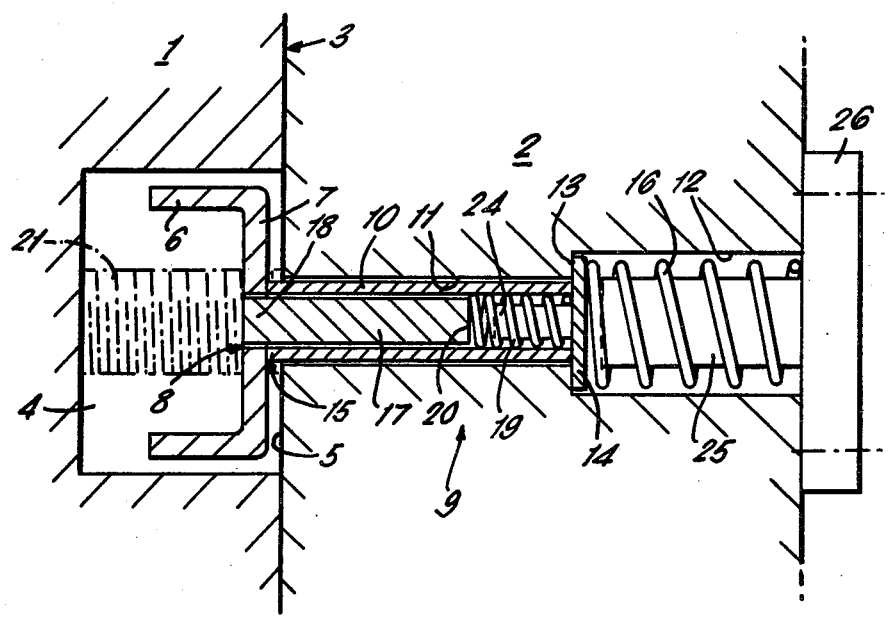
FIG. 1a shows a part of a tool for use in a moulding machine according to one embodiment of the invention, which is used to make a steel-cored back nut.
Figure 1B:
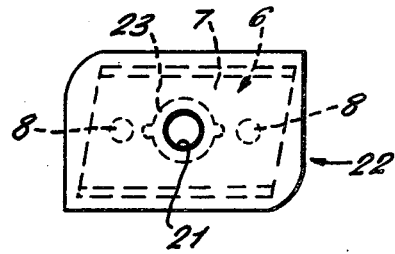

Referring to FIGS. 1a and 1b, a tool for use in a moulding machine includes two tool parts 1 and 2 which are relatively movable towards and away from each other between an operative position, as shown, in which they abut one another along a tool split line 3, and an inoperative position spaced from each other, i.e. one of the tool parts, preferably tool part 1, is stationary, whilst the other tool part is movable. Tool part 1 includes at least one recess 4 so that when the tool parts abut, a mould cavity is formed by the walls of the recess 4 and the surface 5 of the tool part 2 adjacent the recess 4.

At the commencement of a moulding operation, a steel core insert 6 is supported within the mould cavity formed when the tools abut. The core insert 6 is a U-shaped channel member in this example, but may be a plate, the central portion 7 of the core insert 6 having two symmetrically located holes 8 by which it is supported in the cavity by a pair of support mechanisms 9, of which one can be seen in FIG. 1. Each support mechanism 9 includes a hollow cylindrical rod 10 which is slidingly located within a bore 11 in tool part 2. A second bore 12 of greater diameter than bore 11 is provided in tool part 2 and is coaxial with bore 11 and connected thereto by a step 13. The inner end of rod 10 is closed off by an end piece 14 which abuts the step 13, as shown, when the other end 15 of rod 10 protrudes from face 5 a maximum distance into the mould cavity to support the rear face of the central portion 7 of the core insert 6 around the respective hole 8. The rod 10 is biassed into this position of maximum protrusion by a helical spring 16 which bears on the end piece 14.

A second solid cylindrical rod 17, also forming a part of the support mechanism, is slidingly and coaxially located within rod 10 and is similarly biassed into the position shown in FIG. 1a, in which its outer end 18 protrudes for a maximum distance from the end 15 of rod 10, by a second helical spring 19 which acts between end piece 14 and the inner end 20 of rod 17. The outer end 18 of rod 17 is adapted to engage the respective hole 8 in the core insert 10 to locate the core insert within the cavity.

Means (not shown) are provided for supplying molten plastics material, in this case glass-fibre impregnated nylon, to the cavity when the core insert is located and supported therein by the two support mechanisms. The melt is supplied under pressure so that it flows freely around the core insert without leaving any space unfilled. It should be noted that the centrally located screw threading 21 in the finished nut 22 is preferably formed using a conventional core (not shown) having external threading which passes through a hole 23 (FIG. 1b) in the core insert 6 located between the holes 8, and which is automatically removed from the finished nut after moulding is completed. Once the cavity is substantially filled, the pressure of the melt causes the inner rod 17 to retract within rod 10 against the action of spring 19 until its inner end 20 engages a solid core 24, situated within the spring 19 and connected to end piece 14, which halts the rearward motion of rod 17. At this point the end 18 of rod 17 is substantially flush with the outer end 15 of rod 10. Continuing pressure in the melt then acts on rod 10 which retracts into the tool part 2 against spring 16 until the end piece 14 engages a second solid core 25 fixed to a retaining member 26 which is bolted to tool 2, at which time the outer end 15 is flush with the surface 5 on tool part 2, thus completing that wall of the mould cavity.

In this way, when the flow of melt is shut off, and the mould opened, the core insert 6 is completely embedded in the nylon and no further operation on the moulded back nut is required.

It should be noted that the retracted positions of the two rods 10 and 17 depend on the desired final shape of the moulded article, and thus they need not necessarily be flush with the surface 5.

Figure 2A:
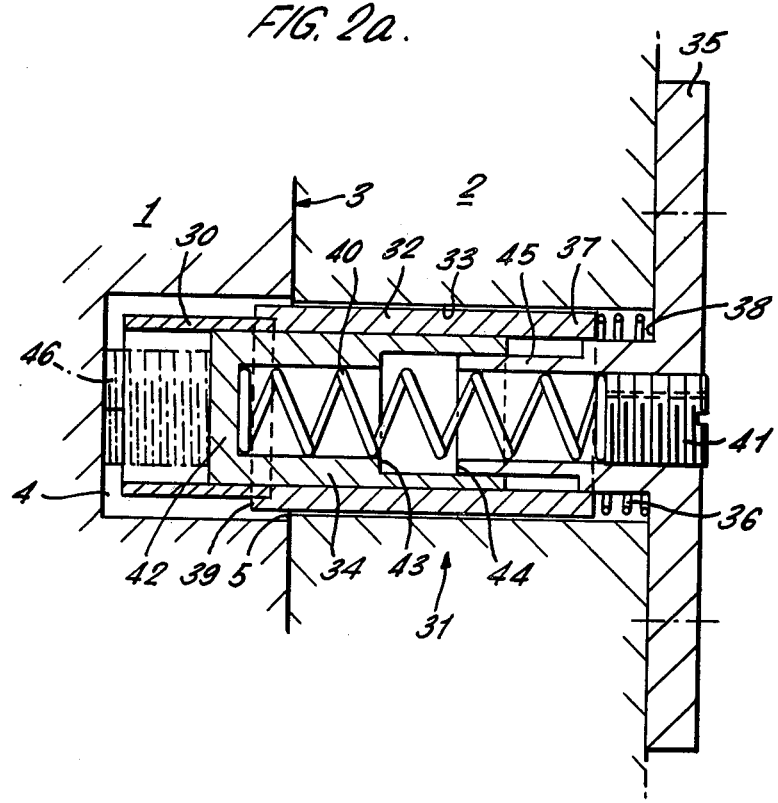
FIG. 2a shows a part of a tool for use in a moulding machine according to a second embodiment, used for making a steel-cored hexagonal nut.
Figure 2B:
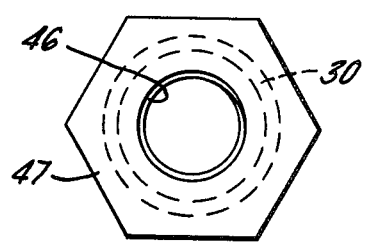

The embodiment illustrated in FIG. 2a and 2b operates on a similar principle to that used in the first embodiment, but is designed for making a nut of different shape, i.e. a hexagonal nut. As before, the tool parts 1 and 2 are arranged to abut along a tool split line 3 when in their operative positions, so that a mould cavity of the desired shape is formed by the recess 4 in tool part 1 and the adjacent surface 5 of tool part 2. A tubular steel core insert 30 is supported in the mould cavity by a single support mechanism 31 located in tool part 2. The support mechanism 31 comprises three main coaxial components, namely an outer hollow cylindrical rod 32 which is slidingly located within a bore 33 in tool part 2, an inner hollow rod 34 which is slidingly located within rod 32, and a retaining member 35 which is bolted to tool part 2.

The rod 32 is biassed by a helical spring 36, acting between the inner end 37 of rod 32 and a radial shoulder 38 on the retaining member 35, into the illustrated position in which the outer end 39 of rod 32 fits around an outer end portion of the core insert 30 thereby positioning it correctly in the mould cavity. The rod 34 is similarly biassed outwardly by means of a second helical spring 40 which acts between a spring tensioning plug 41, which is screwed into the retaining member 35 and the outer end 42 of the rod 34 which is closed off. In this way the outer end 42 of rod 34 is normally positioned as shown inside the tubular core insert 30 to support it in the cavity. The relative stiffnesses of the two springs 36 and 40 are arranged so that during moulding, the inner rod 34 is first retracted into rod 32, and subsequently rod 32 is retracted into tool part 2 so that the wall of the mould cavity is completed. The limit of retraction of rod 32 is determined by the maximum compression of spring 36, although it would be possible to use a suitable stop member. The retraction of rod 34 is halted when an abutment shoulder 43 on its inner surface engages the end surface 44 of a cylindrical extension 45 of the retaining member. In this embodiment the central threaded bore 46 of the finished nut 47 is formed during moulding by a core (not shown) having external threading which projects into the mould cavity through the end wall of the recess 4 opposite surface 5 and, at the start of a moulding operation occupies the position shown diagrammatically in dotted lines at 46' in FIG. 2a, with the free end of the core in contact with the outer end 42 of rod 34. As the rod 34 retracts, the core moves further into the mould cavity, thereby forming the central bore 46. At the end of the moulding operation, the core is withdrawn automatically from the moulded nut in the usual way.

The embodiments illustrated in FIGS. 3 and 4 are concerned with the manufacture of elongate shaped plastic members, in this instance studs and set screws respectively. In view of the length of the core insert, it is necessary to support it at each end, and for this purpose, the tool part 1 containing the mould cavity, in this case a bore 50 having the desired inverse shape of the finished article and extending through the whole width of tool part 1, is sandwiched between a pair of similar tool parts 2, each containing a support mechanism which is suitable for supporting the respective end of the core insert. In the embodiment shown in FIG. 3, which is for use in making studs which are symmetric, identical support mechanisms 51 are provided in each tool part 2, only one of which is shown for clarity. In the embodiment shown in FIG. 4 which is for use in making set screws, a support mechanism 52 suitable for supporting a core insert with a head is provided in the tool part 2 adjacent an enlarged end 50a of the mould cavity 50 which forms the head of the set screw, as shown, whilst the support mechanism in the other tool part 2 (not shown) is identical to the mechanisms 51 used in the embodiment of FIG. 3.

Referring to FIG. 3 of the drawings, the support mechanism 51 includes a rod 53 slidable in a bore 54 in a sleeve 55. The sleeve 55 has a coarse external screw thread 56 and engages in a bush 57 mounted in a bore in the tool part 2. The rod 53 projects into the die cavity and is formed with a short spigot 57a at the end located in the die cavity which is formed with a pointed end 58 to engage in a recess formed at one end of a threaded steel core 59 to support the core concentrically in the mould cavity 50. The other end of the core is similarly supported. Thus when the cavity is filled with plastics under pressure, the pressure can act on the end face of the rod to cause the rod to retract as described later.

A headed screw 60 is screwed into the end of the rod 53 located within the sleeve 55 and an integral shoulder 61 encircling the inner sleeve limits the movement of the rod 53 with respect to the sleeve by engagement of the end of the sleeve or the head of the screw with the shoulder. When the sleeve engages the shoulder, the rod 53 is fully retracted into the sleeve 55 and the other end of the rod 53 is flush with the end of the sleeve.

The rod 53 is urged outwardly of the sleeve to the limit of its movement defined by engagement of the bolt head with the shoulder by a helical spring 62 engaged between the head of the bolt and set screw 63 screwed into the end of the sleeve 55 remote from the mould. By adjustment of the screw 63, the pre-compression of the spring 62 can be adjusted thus adjusting the force required to retract the outer rod 53 from the mould cavity. The sleeve 55 is adjusted in the bush 57 by screwing the sleeve into and out of the bush and its position is locked by a pair of lock nuts 64 engaged on the end of the sleeve projecting from the bush.

As indicated earlier, a similar arrangement is provided at the other end of the mould cavity so that the screw threaded steel core 59 is supported on projecting spigots 57 of a pair of rods 53 disposed at either end of the cavity. When the cavity is filled with plastics, the plastics envelopes the core and, when the cavity is completely filled, the pressure in the cavity will rise. The rise in pressure acts on the ends of the rods 53 forcing the rods out of the cavity until their end faces are flush with the end walls of the cavity. The spigots 57a will then be detached from the steel core so that the whole of the circumference of the core and also the ends of the core will be fully encapsulated in the plastics.

FIG. 4 shows a modified arrangement for encapsulating the headed end of a steel insert. The rod and its spring loaded arrangement are similar to that of the arrangement described above and the rod has a projecting spigot 57a which engages in a recess 58 at the centre of the head of the core. The face of the head is convexly curved as indicated at 65 to ensure that the plastics material can penetrate between the head and the end of the rod 53 and apply pressure to the end of the rod to cause the rod to retract from the die. Once the rod 53 retracts, the spigot 57a will be detached from the head of the steel insert so that the head will be fully encapsulated in the plastics material. The other end of the die is identical to the arrangement shown in FIG. 3.

It will be understood that although in the embodiments described the mould cavity is formed wholly within the tool part, it is also possible to provide recesses in both tool parts, 1 and 2 so that the tool split line 3 is spaced from either end of the cavity. In addition, several mould cavities may be provided so that several articles may be moulded simultaneously.

I claim:

1. A tool for use in a moulding machine comprising: a mould defining a mould cavity; means for introducing plastic material under pressure into the mould; and means for supporting a core insert in the mould cavity away from the mould during a moulding operation, said supporting means comprising at least one support member, means for mounting said support member for movement between a first position in which the member projects into the mould cavity so as to support the core insert at the commencement of a moulding operation and a second position in which the member is at least partially retracted from the mould cavity to disengage from the core insert, and means for urging said support member toward said first position, whereby when material is introduced into the mould cavity the support member is moved from the first position to the second position against the force of said urging means by the pressure of the material in the mould cavity during the moulding operation after the core insert has been enveloped in the material.

2. A tool as claimed in claim 1 wherein the support member has a spigot projecting at one end thereof and extending into the mould cavity at least in the first position, so that the one end of the member is spaced, in use, from the core insert to receive the force of the pressurised material in the mould cavity to urge the member at least partially from the mould cavity.

3. A tool as claimed in claim 1 wherein the urging means comprises spring means for resisting the movement of the member towards its second position so that the member is only moved to its second position after the cavity has been filled with material and pressurised.

4. A tool as claimed in claim 1 or 3 wherein the means for supporting a core insert further comprise a stop for engaging the member to define its second position so that the one end of the member is substantially flush with the surface of the cavity when the member is urged into its second position.

5. A tool as claimed in claim 1 wherein the means for supporting a core insert comprises a pair of co-axial elongate support members located one inside the other, each having a free end which is shaped for engaging in use a respective portion of the core insert, the free ends projecting into the cavity by different amounts, the support members being telescopically collapsable one within the other.

6. A tool as claimed in claim 1 wherein the mould is formed in two parts, the first part defining a recess in one of its surfaces, the second part defining a bore extending from one of its surfaces, the support member being slidably located in the bore, said second part being abuttable, in use, with said first part to close the recess with its bore aligned with the recess, the recess and the second part together defining the mould cavity.

7. A tool as claimed in claim 6 wherein the recess extends through said first part and wherein said mould further comprises a third part defining a bore extending from a surface thereof for slidably receiving a further support member and being abuttable with said first part, to close in use the other end of the recess to that closed by the second part with its bore aligned with the recess, the mould cavity being defined by the recess and said second and third parts.

* * * * *